US012734807B2

(12) United States Patent
Rummelsberger et al.

(10) Patent No.: US 12,734,807 B2
(45) Date of Patent: Sep. 15, 2026

(54) DEVICE AND METHOD FOR REGENERATING A PRINT HEAD

(71) Applicant: Canon Production Printing Holding B.V., Venlo (NL)

(72) Inventors: Christoph Rummelsberger, Ismaning (DE); Florian Hitzlsperger, Poing (DE); Ulrich Stöckle, Germering (DE)

(73) Assignee: Canon Production Printing Holding B.V., Venlo (NL)

( * ) Notice: Subject to any disclaimer, the term of this patent is extended or adjusted under 35 U.S.C. 154(b) by 158 days.

(21) Appl. No.: 18/739,821

(22) Filed: Jun. 11, 2024

(65) Prior Publication Data

US 2024/0408874 A1 Dec. 12, 2024

(30) Foreign Application Priority Data

Jun. 12, 2023 (DE) ..................... 10 2023 115 212.2

(51) Int. Cl.
*B41J 2/165* (2006.01)
*B41J 2/17* (2006.01)

(52) U.S. Cl.
CPC ........... *B41J 2/1652* (2013.01); *B41J 2/1707* (2013.01); *B41J 2002/1657* (2013.01); *B41J 2002/16573* (2013.01)

(58) Field of Classification Search
CPC ........ B41J 2/2114; B41J 25/001; B41J 3/543; B41J 29/393; B41J 2/04571
See application file for complete search history.

(56) References Cited

U.S. PATENT DOCUMENTS

| | | | | |
|---|---|---|---|---|
| 2006/0158472 | A1* | 7/2006 | Endo | B41J 11/0095 347/14 |
| 2010/0110155 | A1 | 5/2010 | Delueg | |
| 2012/0050376 | A1* | 3/2012 | Nagoshi | B41J 29/393 347/19 |
| 2013/0176354 | A1* | 7/2013 | Kim | B41J 2/04581 347/10 |
| 2016/0052314 | A1 | 2/2016 | Van Den Heuvel | |
| 2019/0047282 | A1* | 2/2019 | Luecke | B41J 2/1714 |
| 2019/0299680 | A1* | 10/2019 | Kurihara | B41J 2/2103 |
| 2020/0406614 | A1* | 12/2020 | Rummelsberger | B41J 2/04581 |
| 2022/0194104 | A1* | 6/2022 | Hasebe | B41J 2/135 |
| 2023/0129713 | A1* | 4/2023 | Yuasa | B41J 2/2142 347/19 |

FOREIGN PATENT DOCUMENTS

| | | | |
|---|---|---|---|
| AT | 507445 | B1 | 9/2011 |
| JP | 2006095361 | A | 4/2006 |

* cited by examiner

*Primary Examiner* — John P Zimmermann
(74) *Attorney, Agent, or Firm* — The Webb Law Firm

(57) ABSTRACT

Provided is a controller for regenerating a print head of an inkjet printing device. The controller is configured to convey ink out of the print head via the nozzle openings of one or more nozzles of the print head, and to subsequently convey said ink into the print head again, in order to efficiently and reliably remove deposits from the nozzle plate of the print head.

20 Claims, 3 Drawing Sheets

DEVICE AND METHOD FOR REGENERATING A PRINT HEAD

CROSS-REFERENCE TO RELATED APPLICATION

This application claims priority to German Patent Application No. 10 2023 115 212.2 filed Jun. 12, 2023, the disclosure of which is hereby incorporated by reference in its entirety.

BACKGROUND OF THE INVENTION

Field of the Invention

The invention relates to a method and a device for regenerating a print head of an inkjet printing device.

Description of Related Art

An inkjet printing device for printing to a recording medium can comprise at least one print bar having one or more print heads, wherein each print head typically has a plurality of nozzles. The nozzles are respectively configured to eject ink droplets in order to print dots of a print image onto the recording medium.

During printing, deposits may form on the nozzle plate of a print head, which deposits can comprise in particular dried ink. Such deposits can lead to an degradation of the print quality and/or to a failure of individual nozzles of the print head.

To clean the nozzle plate of a print head, the nozzle openings of the one or more nozzles of the print head can be flushed with ink during a dedicated cleaning process. The flushing with ink leads to an increased ink consumption of the inkjet printing device. The nozzle plate of the print head may also be wiped off with a wiping element within the scope of the cleaning process, which, however, can lead in the long term to a mechanical degradation of the nozzle plate.

SUMMARY OF THE INVENTION

The present disclosure deals with the technical object of effecting a particularly efficient and gentle regeneration, in particular cleaning, of a print head of an inkjet printing device. The object is achieved via the features as described herein. Furthermore, the object is achieved via the features as described herein.

According to one aspect of the invention, a device is described for regenerating a print head of an inkjet printing device, which print head comprises at least nozzle, wherein the nozzle opening of the nozzle is arranged at the nozzle plate of the print head. The device is configured to have the effect that ink is conveyed from the chamber of the nozzle, through the nozzle opening, to the nozzle plate, and remains on the nozzle plate for a dwell time; and, after the expiration of the dwell time, that the ink is conveyed back into the chamber of the nozzle via the nozzle opening.

According to a further aspect of the invention, a method is described for regenerating a print head of an inkjet printing device. The method comprises effecting that ink is conveyed from the chamber of the nozzle to the nozzle plate and remains on the nozzle plate for a dwell time, and that, after expiration of the dwell time, the ink is conveyed from the nozzle plate back into the chamber of the nozzle.

BRIEF DESCRIPTION OF THE DRAWINGS

Exemplary embodiments of the invention are described in detail in the following using the schematic drawings. Thereby shown are.

DESCRIPTION OF THE INVENTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure. The connections shown in the figures between functional units or other elements can also be implemented as indirect connections, wherein a connection can be wireless or wired. Functional units can be implemented as hardware, software or a combination of hardware and software.

Figure 1A:
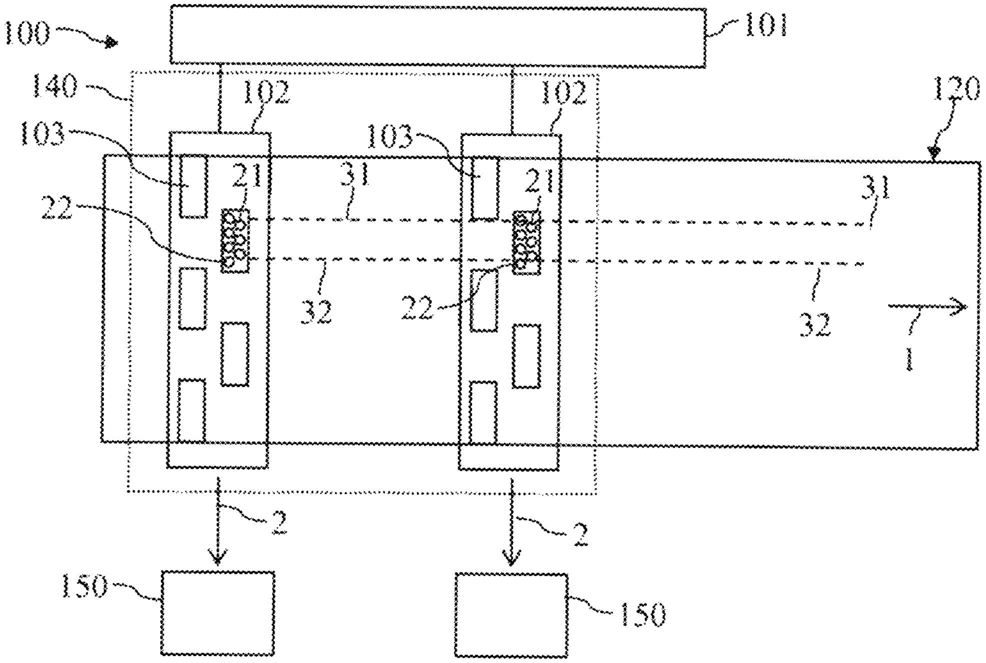
FIG. 1*a* a block diagram of an example of an inkjet printing device.

The printing device 100 depicted in FIG. 1*a* is designed for printing onto a recording medium 120 in the form of a sheet or page or plate or belt. The recording medium 120 can be produced from paper, paperboard, cardboard, metal, plastic, textiles, a combination thereof, and/or other materials that are suitable and can be printed to. The recording medium 120 is transported along the transport direction 1 (represented by an arrow) through the print group 140 of the printing device 100.

In the depicted example, the print group 140 of the printing device 100 comprises two print bars 102, wherein each print bar 102 can be used for printing with ink of a defined color (for example black, cyan, magenta, and/or yellow, and MICR ink if applicable). Furthermore, the printing device 100 typically comprises at least one fixing or drying unit (not shown) that is configured to fix a print image printed onto the recording medium 120.

A print bar 102 can comprise one or more print heads 103 that, if applicable, are arranged in a plurality of rows side-by-side in order to print the dots of different columns 31, 32 of a print image onto the recording medium 120. In the example depicted in FIG. 1*a*, a print bar 102 comprises five print heads 103, wherein each print head 103 prints the dots of a group of columns 31, 32 of a print image onto the recording medium 120.

In the embodiment illustrated in FIG. 1*a*, each print head 103 of the print group 140 comprises a plurality of nozzles 21, 22, wherein each nozzle 21, 22 is configured to fire or eject ink droplets onto the recording medium 120. For example, a print head 103 of the print group 140 can comprise multiple thousands of effectively utilized nozzles 21, 22 that are arranged along a plurality of rows transverse to the transport direction 1 of the recording medium 120. Dots of a line of a print image can be printed onto the recording medium 120 transverse to the transport direction 1, i.e. along the width of the recording medium 120, by means of the nozzles 21, 22 of a print head 103 of the print group 140.

The printing device 100 also comprises a controller 101, for example an activation hardware and/or a processor, that is configured to drive actuators of the individual nozzles 21, 22 of the individual print heads 103 of the print group 140 in order to apply the print image onto the recording medium 120 depending on print data. In an exemplary embodiment, the controller 101 includes processing circuitry that is configured to perform one or more functions and/or operations of the controller 101, including activating the actuators of the individual nozzles 21, 22 of the individual print heads 103 of the print group 140 to apply the print image onto the recording medium 120 depending on print data, processing print data and/or other data, controlling one or more modes of the printing device 100 and/or controlling one or more operations of the printing device 100. In an exemplary embodiment, the controller 101 includes one or more interfaces (e.g. a wired and/or wireless input and/or output interface, transceiver, or the like) that is configured to receive or output data or information. For example, the controller 101 may receive signals generated by one or more components of the printing device 100 (e.g. from a user interface of the printer device 100) and/or output control signals to one or more components of the printing device 100. In an exemplary embodiment, the controller 101 includes a memory configured to store data/information, and/or store executable code that is executable by the processing circuitry to cause the processing circuitry to perform the operation(s) of the controller 101.

The print group 140 of the printing device 100 thus comprises at least one print bar 102 having K nozzles 21, 22 that can be driven with a defined line timing in order to print a line, said line traveling transverse to the transport direction 1 of the recording medium 120, with K pixels or K columns 31, 32 of a print image onto the recording medium 120, for example with K>1000. In the depicted example, the nozzles 21, 22 are installed so as to be immobile or fixed in the printing device 100, and the recording medium 120 is directed past the stationary nozzles 21, 22 with a defined transport velocity.

Furthermore, the printing device 100 can comprise one or more regeneration devices 150 for the one or more print bars 102. A print bar 102 can be transitioned from a printing position, at which the print bar 102 is arranged above the recording medium 120, into a cleaning or servicing position. For this purpose, the print bar 102 can be moved in the movement direction 2, indicated by an arrow. In the cleaning or servicing position, the nozzle plates of the one or more print heads 103 of a print bar 102 can then be cleaned, for example wiped off, using a regeneration device 150. The printing device 100 can have at least or precisely one regeneration device 150 for each print bar 102.

Figure 1B:
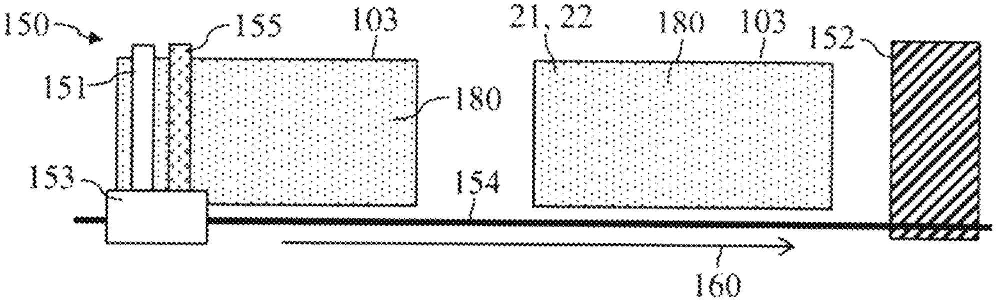
FIG. 1*b* an example of a regeneration device of an inkjet printing device, in a view from below.

FIG. 1*b* shows a view of the regeneration device 150 from below toward the nozzle plates 180 of two print heads 103 of a print bar 102. The print heads 103 are arranged serially along a cleaning axis 160. The cleaning axis 160 thereby typically runs parallel to the movement direction 2, which runs transverse—preferably orthogonal—to the transport direction 1. Arranged on the underside or the nozzle plate 180 of a print head 103 are the outputs or nozzle openings of the one or more nozzles 21, 22 of the print head 103.

In the cleaning or servicing position, the one or more nozzles 21, 22 of the print head 103 can be induced to eject ink, for example by increasing the pressure within the one or more nozzles 21, 22. This step is typically referred to as "purging." Furthermore, the nozzle plate 180 of a print head 103 can be sprayed with a (cleaning) fluid 156 by one or more spray nozzles 155. The underside or nozzle plate 180 of a print head 103 can subsequently be cleaned with a wiper 151. The wiper 151 can be moved along the cleaning axis 160 across the nozzle plate 180 of a print head 103 in order to clean the nozzle plate 180 of ink that has remained on the nozzle plate 180. This step is typically referred to as "wiping."

The wiper 151 and/or a spray nozzle 155 can be attached (separately or together) to a sled or a wiper mount 153 that is guided along the nozzle plate 180 of a print head 103 along a guide rail 154. A sled 153 can thereby guide one or more wipers 151 across the nozzle plates 180 of a plurality of print heads 103 (in particular all print heads 103) of a print bar 102. The fluid that is thereby wiped off can drip into a pan (not shown), wherein the pan is arranged below the sled 153. After the nozzle plates 180 of the one or more print heads 103 have been wiped off, the wiper 151 can be moved into a cleaning module 152 in which the wiper 151 is cleaned.

Figure 2:
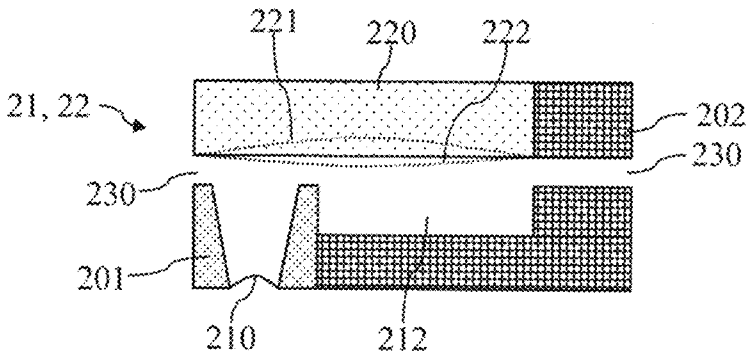
FIG. 2 an example of a nozzle.

The cleaning of a print head 103 of an inkjet printing device 100 is thus linked with a relatively high ink consumption. In this disclosure, a method is described for regenerating, in particular for cleaning, a print head 103 with a reduced ink consumption, in particular without any ink consumption at all. In this context, FIG. 2 shows an example of a structure of a nozzle 21, 22 of a print head 103. The nozzle 21, 22 comprises walls 202 which, together with an actuator 220, form a container or a pressure chamber 212 to receive ink, wherein the pressure chamber 212 is also referred to as an ink chamber 212. An ink droplet can be fired onto the recording medium 120 via a nozzle opening 201 of the nozzle 21, 22. The ink forms what is known as a meniscus 210 at the nozzle opening 201. Furthermore, the nozzle 21, 22 comprises an actuator 220, for example a piezoelectric element, that is configured to vary the volume of the pressure chamber 212 to receive the ink, or to vary the mechanical pressure of the ink in the pressure chamber 212 of the nozzle 21, 22. In particular, the volume of the pressure chamber 212 can be reduced, and the pressure in the pressure chamber 212 increased, by the actuator 220 as a result of a deflection 222. An ink droplet is thus ejected from the nozzle 21, 22 via the nozzle opening 201. FIG. 2 shows a corresponding deflection 222 of the actuator 220 as a dotted line. Moreover, the volume of the pressure chamber 212 can be increased by the actuator 220, as depicted by the deflection 221, in order to draw new ink into the pressure chamber 212 via an ink supply channel 230.

Via a deflection 221, 222 of the actuator 220, the ink within the nozzle 21, 22 can thus be moved and the ink in the chamber 212 can be placed under mechanical pressure. A defined movement of the actuator 220 thereby produces a corresponding defined movement of the ink. The defined movement of the actuator 220 is typically produced by a corresponding defined waveform or a corresponding defined pulse of an activation signal of the actuator 220. In particular, via a fire pulse (which is also referred to as an ejection pulse) it can be effected that the nozzle 21, 22 ejects an ink droplet via the nozzle opening 201. The ejection of ink droplets with different properties can be effected via different types of activation signals at the actuator 220. In particular, the ejection of ink droplets with different droplet size or with different ink quantities can be effected via different types of activation signals. Furthermore, via a pre-fire pulse, which is also referred to as pre-ejection pulse or generally as a non-ejection pulse, it can be effected that, although the nozzle 21, 22 produces a movement of the ink and an oscillation of the meniscus 210 at the nozzle exit, no ink droplet is thereby ejected via the nozzle opening 201.

The procedure described in conjunction with FIG. 1*b* for regenerating the nozzles 21, 22 of a print head 103 is linked with a relatively high ink consumption and time cost. A particularly resource-efficient regeneration process, in particular cleaning process, is described in conjunction with FIGS. 3*a* through 3*d*. The print head 103 depicted in FIGS. 3*a* through 3*d* has an ink inflow 301 via which ink 305 can be supplied to the print head 103, in particular to the ink supply channel 230 of the print head 103. A valve 303 that can be opened or closed in order to enable or restrict the flow of ink 305 into the print head 103 can be arranged at the inflow 301.

The print head 103 can also have an ink outflow 302 via which ink 305 can be removed from the print head 103, in particular from the ink supply channel 230 of the print head 103. The ink outflow 302 can be opened or closed, possibly via a valve 303. The print head 103 can thus be designed to enable a flow-through of ink into, through, and back out of the print head 103 again. The ink 305 flowing out of the print head 103 can possibly be filtered by a filter 304 that, for example, is arranged at the ink outflow 302 of the print head 103.

Deposits 310 can form on the nozzle plate 180 of the print head 103 during the operation of the print head 103. The deposits 310 can in particular comprise dried ink 305. The individual nozzles 21, 22 and/or the print head 103 can be designed to convey ink 305 out of the individual nozzles 21, 22 via the nozzle openings 201 so that a respective ink droplet 320 forms at the individual nozzle openings 201, as is depicted by way of example in FIG. 3*b*. It can thus be effected that ink droplets 320 form at the nozzle plate 180 of the print head 103, wherein the ink droplets 320 remain adhered to the nozzle plate 180 and are not ejected onto the recording medium 120.

The print head 103 can be designed to generate a positive pressure in the individual nozzles 21, 22 in order to effect that ink droplets 320 form at the nozzle openings 201 and/or at the nozzle plate 180. The positive pressure can be effected in that the valve 303 at the ink outflow 302 is at least partially closed or entirely closed while ink 305 continues to be pumped into the print head 103 via the ink inflow 301. Alternatively or additionally, the positive pressure in the individual nozzles 21, 22 can be effected by operating the actuators 220 of the individual nozzles 21, 22. For example, the volume in the chambers 212 of the individual nozzles 21, 22 can be non-transiently reduced.

The ink droplets 320 produced at the nozzle plate 180 act on deposits 310 that are arranged on the nozzle plate 180. It can thereby be effected in particular that dried ink 305 is dissolved by the ink droplets 320. The ink droplets 320 can be left on the nozzle plate 180 for a defined dwell time. The dwell time can thereby depend on one or more properties of the ink 305, for example the viscosity and/or the evaporation tendency of the ink 305, and/or on one or more ambient conditions of the environment of the print head 103, for example the temperature and/or the humidity. The dwell time can, on the one hand, be chosen to be as long as possible in order to enable an optimally long action of the ink droplets 320 on the deposits 310. On the other hand, the dwell time can be chosen to be sufficiently short in order to avoid a drying of the ink droplets 320 on the nozzle plate 180.

Figure 3A:
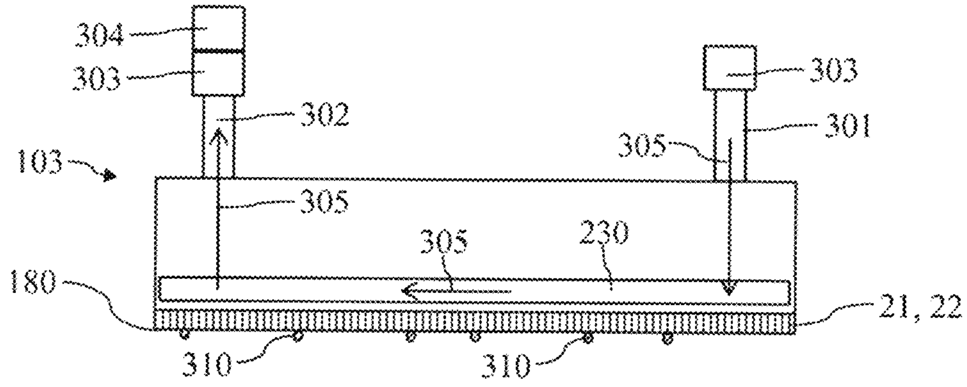
FIG. 3*a* an example of a print head with deposits on the nozzle plate of the print head.
Figure 3B:
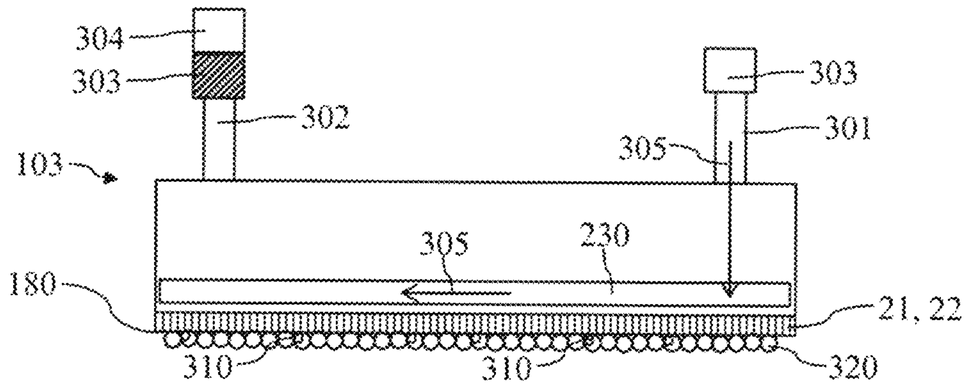
FIG. 3*b* the print head from FIG. 3*a*, with ink droplets to clean the nozzle plate of the print head.
Figure 3C:
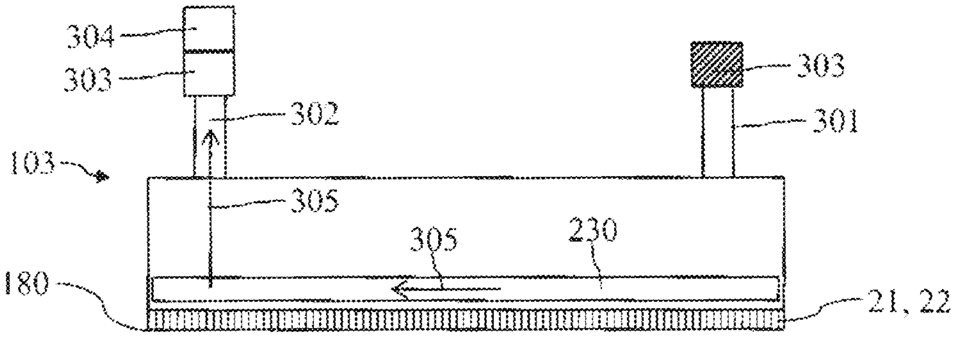
FIG. 3*c* the print head from FIG. 3*b*, in a suction state to suction the ink droplets.
Figure 3D:
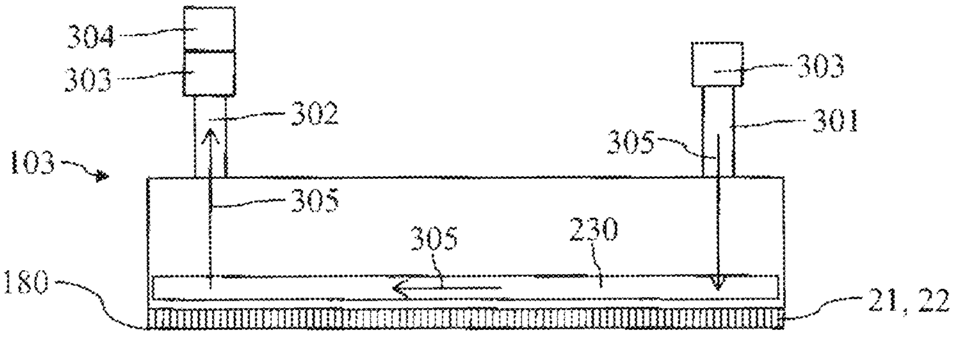
FIG. 3*d* the print head from FIG. 3*c*, in a flushing state to flush the ink supply channel of the print head.

After the dwell time has elapsed, it can be effected that the ink droplets 320 are suctioned back again into the chambers 212 of the individual nozzles 21, 22 via the nozzle openings 201 of the individual nozzles 21, 22, as is shown by way of example in FIG. 3*c*. The deposits 310 are thereby conveyed, together with the ink droplets 320, away from the nozzle plate 180 into the nozzle chambers 212, so that the nozzle plate 180 is cleaned.

The suction of the individual ink droplets 320 can be effected via a negative pressure in the chambers 212 of the individual nozzles 21, 22. The negative pressure can be generated in that the valve 303 at the ink inflow 301 is at least partially or entirely closed while ink 305 is conveyed, in particular pumped, out of the print head 103 via the ink outflow 302. Alternatively or additionally, the negative pressure in the chambers 212 of the individual nozzles 21, 22 can be generated by the actuators 220 of the individual nozzles 21, 22, for example by increasing the volume of the chambers 212 of the individual nozzles 21, 22.

Following the suctioning of the ink droplets 320, it can be effected that the print head 103 is flushed with ink 305 so that possible undissolved deposits 310 are conveyed out of the print head 103, and if applicable are filtered out of the ink 305 by the filter 304. The valve 303 at the ink inflow 301 and the valve 303 at the ink outflow 302 can be opened for flushing of the print head 103, as is depicted by way of example in FIG. 3*d*.

In FIGS. 3*a* through 3*d*, a regeneration process is depicted in which a respective ink droplet 320 is generated at the nozzle openings 201 of all nozzles 21, 22 of the print head 103. This can be efficiently effected in that a positive pressure is produced in the entire print head 103, for example by closing the valve 303 at the ink outflow 302.

It can possibly be advantageous to selectively generate an ink droplet 320 at the nozzle openings 201 of one or more nozzles 21, 22 to remedy a deposit 310 on the nozzle plate 180. This can be efficiently effected by the actuators of the one or more nozzles 21, 22.

For example, it can be detected, for example within the scope of implementing what is known as a Nozzle Failure Detection (NFD) process, that a defined nozzle 21, 22 of the print head 103 is impaired. The aforementioned regeneration process can then be implemented selectively for the defined nozzle 21, 22 and, if applicable, for one or more additional nozzles 21, 22 in the immediate surroundings of the defined nozzle 21, 22. In particular, ink droplets 320 can be selectively produced at the defined nozzle 21, 22 and, if applicable, at one or more additional nozzles 21, 22 in the surroundings of the defined nozzle 21, 22, in order to remedy a deposit 310 at the nozzle opening 201 of the defined nozzle 21, 22. A particularly efficient regeneration, in particular cleaning, of a print head 103 can be implemented via the selective production of ink droplets 320.

As has already been discussed further above, contaminant particles 310 that influence the inkjet process can be arranged relatively close to the opening 201 of a nozzle 21, 22. The contaminant particles 310 often comprise dried ink particles. Given use of a pass-through print head 103 in which ink 305 can be circulated, the possibility exists to refresh the nozzle plate 180 of the print head 103 in that ink 305 is pressed out of the opening 201 of a nozzle 21, 22, onto the nozzle plate 180, in order to dissolve the contaminant 310 with fresh ink 305. The ink 305 can thereupon be taken up again by applying negative pressure and by subsequent circulation. The solvents contained in the ink 305 dissolve the deposits 310 on the surface and thus clean the nozzle plate 180, in particular what is known as the "anti-wetting surface," of the print head 103. The nozzle plate 180 is cleaned by the reuptake of the ink 305 and can be used again for a reliable inkjet formation.

The described regeneration process has an especially high ink efficiency, since no ink 305 is removed from the system. Moreover, no mechanical action on the nozzle plate 180 takes place, such that an especially gentle regeneration is effected. In particular, damage to the "anti-wetting surface" of the print head 103 can be avoided. Furthermore, a time-efficient regeneration of all print heads 103 can be effected, since the print heads 103 do not need to be transitioned into the cleaning or servicing position. The described regeneration process can be implemented while the one or more print heads 103 are located in the printing position. The described regeneration process can also be implemented during a running printing process.

Figure 4:
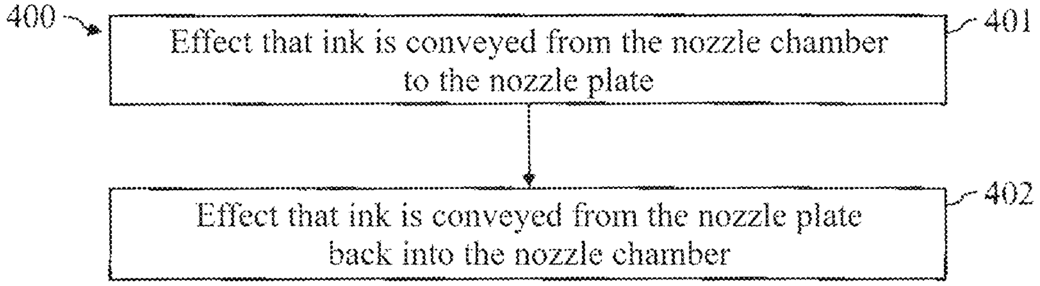
FIG. 4 a workflow diagram of an example of a method for regenerating a nozzle of a print head.

FIG. 4 shows a workflow diagram of an example of a method 400, possibly a computer-implemented method 400, for regenerating a print head 103 of an inkjet printing device 100. The print head 103 comprises at least one nozzle 21, 22, wherein the nozzle opening 201 of the nozzle 21, 22 can be arranged at the nozzle plate 180 of the print head 103. The print head 103 typically comprises a plurality of nozzles 21, 22, for example 500 or more or 1000 or more nozzles 21, 22, that respectively have a nozzle opening 201 arranged at the nozzle plate 180.

The method 400 comprises—in particular within the scope of a regeneration process to regenerate the print head 103—effecting that ink 305 is conveyed, in particular pumped, from the chamber 212 of the nozzle 21, 22, through the nozzle opening 201, to the nozzle plate 180 of the print head 103, and remains on the nozzle plate 180 for a dwell time. For this purpose, an essentially constant positive pressure can be produced in the chamber 212 for the dwell time. It can be effected that an optimally large ink volume is conveyed to the nozzle plate 180 in order to especially reliably remove one or more deposits 310 from the nozzle plate 180. On the other hand, the ink volume should be small enough that the ink 305 is retained on the nozzle plate 180 and does not drip from the nozzle plate 180. The ink volume conveyed from the chamber 212 to the nozzle plate 180 can depend on the surface tension of the ink 305 and/or on one or more adhesion properties of the nozzle plate 180.

The method 400 also comprises effecting 402 that, after the dwell time has elapsed, the ink 305 is conveyed, in particular is suctioned, back into the chamber 212 of the nozzle 21, 22 via the nozzle opening 201. For this purpose, a possibly constant negative pressure can be produced in the chamber 212 following the dwell time. The ink 305 suctioned into the chamber 212 of the nozzle 21, 22 carries along a possible deposit 310 on the nozzle plate 180, and thus provides for a cleaning of the nozzle plate 180.

A controller 101 of an inkjet printing device 100 for regenerating, in particular for cleaning, a print head 103 of the inkjet printing device 100 is thus described. The printing device 100 can comprise one or more print bars 102 with respectively one or more print heads 103. The individual print heads 103 typically comprise a respective plurality of nozzles 21, 22, for example 100 or more or 200 or more nozzles 21, 22. The individual nozzles 21, 22 of a print head 103 respectively have a nozzle opening 201, wherein the nozzle openings 201 of the individual nozzles 21, 22 are typically arranged at the nozzle plate 180 of the print head 103.

The controller 101 is configured to effect, in particular within the scope of a regeneration process to regenerate the print head 103, that ink 305 is conveyed, in particular pressed or pumped, from the chamber 212 of at least one nozzle 21, 22 of the print head 103, via the nozzle opening 201 of the nozzle 21, 22, onto the nozzle plate 180 of the print head 103. It can also be effected that the ink 305 that is conveyed out remains on the nozzle plate 180 for a defined dwell time. The dwell time can be, for example, 100 ms or more, or 500 ms or more, or 1 second or more. The physical pressure in the chamber 212 of the nozzle 21, 22 can be increased, in particular for the dwell time, in order to effect that ink 305 is conveyed out of the chamber 212 of the nozzle 21, 22, via the nozzle opening 201, to the nozzle plate 180, and remains on the nozzle plate 180 for the dwell time.

The controller 101 is also configured to effect, after the dwell time has elapsed, that the ink 305 is conveyed, in particular suctioned, back into the chamber 212 of the nozzle 21, 22 via the nozzle opening 201. For this purpose, the physical pressure in the chamber 212 of the nozzle 21, 22 can be reduced in order to effect that the ink 305 is conveyed back into the chamber 212 of the nozzle 21, 22 via the nozzle opening 201. The quantity of ink 305 that is conveyed into the chamber 212 of the nozzle 21, 22 again can thereby essentially correspond to the quantity of ink 305 that was previously conveyed out of the chamber 212 of the nozzle 21, 22. One or more deposits 310 can additionally be conveyed, together with the ink 305, from the nozzle plate 180 into the chamber 212 of the nozzle 21, 22.

The controller 101 can thus be configured to convey ink 305 out of the print head 103 via the nozzle openings 201 of one or more nozzles 21, 22 of the print head 103, and to subsequently convey said ink 305 into the print head 103 again, in order to efficiently and reliably remove one or more deposits 310 from the nozzle plate 180 of the print head 103. The removal of the one or more deposits 310 can thereby be effected gently without wiping off the nozzle plate 180.

The controller 101 can be configured to at least partially or entirely close the ink outflow 302 of the print head 103 while ink 305 is being supplied to the print head 103 via the ink inflow 301 of the print head 103, in order to effect that ink 305 is conveyed from the chamber 212 of the nozzle 21, 22, via the nozzle opening 201, to the nozzle plate 180 and remains on said nozzle plate 180 for the dwell time. A positive pressure in the chamber 212 of the nozzle 21, 22 can thus be particularly efficiently and reliably produced, in particular in the chambers 212 of all nozzles 21, 22 of the print head 103.

Furthermore, the controller 101 can be configured to at least partially or completely close the ink inflow 301 while ink 305 is being discharged from the print head 103 via the ink outflow 302, in order to effect that the ink 305 is conveyed back into the chamber 212 of the nozzle 21, 22 via the nozzle opening 201. A negative pressure can thus be particularly efficiently and reliably produced in the chamber 212 of the nozzle 21, 22, in particular in the chambers 212 of all nozzles 21, 22 of the print head 103.

The controller 101 can be configured to effect, after the ink 305 has been conveyed back into the chamber 212 of the nozzle 21, 22 via the nozzle opening 201, that the chamber 212 of the nozzle 21, 22 is flushed with ink 305. Alternatively or additionally, it can be effected that ink 305 is conducted through the print head 103 via the ink inflow 301 of the print head 103, through at least one ink supply channel 230 of the print head 103 that is connected with the chamber 212 of the nozzle 21, 22, and via the ink outflow 302 of the print head 103, in order to flush the print head 103 with ink 305. Possible deposits 310 that are not dissolved in the ink 305 can thus be reliably conducted out of the print head 103 in order to effect a particularly reliable regeneration of the print head 103.

The controller 101 can induce a reduction of the volume of the chamber 212 of the nozzle 21, 22, in particular for the dwell time, so that the ink 305 is conveyed from the chamber 212 of the nozzle 21, 22, via the nozzle opening 201, to the nozzle plate 180, in order to remain on the nozzle plate 180 for the dwell time. Furthermore, the controller 101 can be configured to increase the volume of the chamber 212 of the nozzle 21, 22 again so that the ink 305 is conveyed back into the chamber 212 of the nozzle 21, 22 via the nozzle opening 201. The actuators 220 of the individual nozzles 21, 22 can thus be particularly efficiently used in order to convey the ink 305 out of the respective nozzle 21, 22 and back into the respective nozzle 21, 22. This can be advantageous especially for a selective regeneration of one or more individual nozzles 21, 22 of the print head 103.

The controller 101 can be specified to implement a regeneration process to regenerate the print head 103, in particular when the print head 103 is arranged in a printing position of the printing device 100. For example, a regeneration process can be implemented repeatedly, in particular periodically, during a running printing process.

In reaction to the situation that a regeneration of the print heads should be conducted, the printing process can first be interrupted and the regeneration process can subsequently be started. The print head 103 thereby preferably remains in a printing position given the implementation of the regeneration process. The printing process can be continued after the regeneration process.

The regeneration process described in this disclosure can thus be particularly efficiently implemented within the scope of a running printing process.

The controller 101 can be configured to effect, in particular within the scope of the regeneration process to regenerate the print head 103, that ink 305 is conveyed simultaneously from the chambers 212 of the plurality of nozzles 21, 22, in particular from the chambers 212 of all nozzles 21, 22 of the print head 103, via the nozzle openings 201 of the plurality of nozzles 21, 22, to the nozzle plate 180, and remains on the nozzle plate 180 for a dwell time. Furthermore, after the dwell time has elapsed, it can be effected that the ink 305 is conveyed simultaneously back into the chambers 212 of the plurality of nozzles 21, 22 via the nozzle openings 201 of the plurality of nozzles 21, 22, in particular via the nozzle openings 201 of all nozzles 21, 22, of the print head 103. The regeneration of a plurality of nozzles 21, 22, in particular all nozzles 21, 22, of the print head 103 can thus be particularly efficiently effected simultaneously.

The controller 101 can be configured to determine one or more properties of the ink 305, in particular with regard to the viscosity and/or the enthalpy of vaporization of the ink 305, and/or one or more ambient conditions, in particular with regard to the temperature and/or the humidity, in the immediate environment of the print head 103. For this purpose, a user input of a user of the printing device 100 and/or the sensor data of one or more sensors of the printing device 100 can be resorted to.

The dwell time can be set depending on the one or more properties of the ink 305 and/or depending on the one or more ambient conditions in the environment of the print head 103. The quality of the regeneration of the print head 103 can thus be further increased.

The controller 101 can be configured to identify an impaired nozzle 21, 22 from the plurality of nozzles 21, 22. The impaired nozzle 21, 22 can, for example, be identified within the scope of an NFD process. A subset of nozzles 21, 22 from the plurality of nozzles 21, 22 can then be determined, based on the identified impaired nozzle 21, 22, for implementation of the regeneration process. The subset of nozzles 21, 22 typically comprises the impaired nozzle 21, 22. Furthermore, the subset of nozzles 21, 22 can comprise one or more additional nozzles 21, 22 that directly adjoin the impaired nozzle 21, 22. The subset of nozzles 21, 22 typically comprises only a portion of the plurality of nozzles 21, 22 of the print head 103. The regeneration process described in this disclosure can be particularly efficiently implemented selectively, possibly only for the determined subset of nozzles 21, 22.

Alternatively or additionally, the controller 101 can be configured to identify—for example on the basis of the print data of a print image to be printed-a subset of one or more nozzles 21, 22 from the plurality of nozzles 21, 22 of the print head 103 that, in a time segment, are not used for printing of the print image to be printed. One or more nozzles 21, 22 can thus be identified in which no ink ejection takes place in a defined time segment during the printing of the print image. The time segment is preferably sufficiently long in order to be able to implement the regeneration process described in this disclosure.

The regeneration process described in this disclosure may be implemented selectively for the determined subset of one or more nozzles 21, 22 in the determined time segment. The regeneration process described in this disclosure can thus be particularly efficiently used selectively for one or more nozzles 21, 22 during the printing of a print image in order to increase the print quality of the printing device 100.

Furthermore, in this disclosure an inkjet printing device 100 is described that comprises the controller 101 described in this disclosure.

To enable those skilled in the art to better understand the solution of the present disclosure, the technical solution in the embodiments of the present disclosure is described clearly and completely below in conjunction with the drawings in the embodiments of the present disclosure. The embodiments described are only some, not all, of the embodiments of the present disclosure. All other embodiments obtained by those skilled in the art on the basis of the embodiments in the present disclosure without any creative effort should fall within the scope of protection of the present disclosure.

It should be noted that the terms "first", "second", etc. in the description, claims and abovementioned drawings of the present disclosure are used to distinguish between similar objects, but not necessarily used to describe a specific order or sequence. It should be understood that data used in this way can be interchanged as appropriate so that the embodiments of the present disclosure described here can be implemented in an order other than those shown or described here. In addition, the terms "comprise" and "have" and any variants thereof are intended to cover non-exclusive inclusion. For example, a process, method, system, product or equipment comprising a series of steps or modules or units is not necessarily limited to those steps or modules or units which are clearly listed, but may comprise other steps or modules or units which are not clearly listed or are intrinsic to such processes, methods, products or equipment.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general-purpose computer.

For the purposes of this discussion, the term "processing circuitry" shall be understood to be circuit(s) or processor(s), or a combination thereof. A circuit includes an analog circuit, a digital circuit, data processing circuit, other structural electronic hardware, or a combination thereof. A processor includes a microprocessor, a digital signal processor (DSP), central processor (CPU), application-specific instruction set processor (ASIP), graphics and/or image processor, multi-core processor, or other hardware processor. The processor may be "hard-coded" with instructions to perform corresponding function(s) according to aspects described herein. Alternatively, the processor may access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary embodiments described herein, the memory is any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

REFERENCE LIST

1 transport direction (of the recording medium)
2 movement direction (of a print bar)
21, 22 nozzle
31, 32 column (of the print image)
100 printing device
101 controller
102 print bar
103 print head
120 recording medium
140 print group
150 regeneration device
151 cleaning unit (wiper)
152 cleaning module
153 sled/wiper mount
154 guide rail
155 application unit (spray nozzle)
160 cleaning axis
180 nozzle plate
201 nozzle opening
202 wall
210 meniscus
212 chamber
220 actuator (piezoelectric element)
221, 222 deflection of the actuator
230 ink supply channel
301 ink inflow
302 ink outflow
303 valve
304 filter
305 ink
310 deposit
320 ink droplet
400 method for regenerating a print head
401-402 method steps

The invention claimed is:

1. A controller for regenerating a print head of an inkjet printing device comprising at least one nozzle, wherein a nozzle opening of the nozzle is arranged at a nozzle plate of the print head, the controller comprising at least one processor configured to, during a regeneration process to regenerate the print head:

control the inkjet printing device to convey ink from a chamber of the nozzle, via the nozzle opening, to the nozzle plate, and cause the ink to remain on the nozzle plate for a dwell time; and control the inkjet printing device to, after the dwell time has elapsed, convey the ink back into the chamber of the nozzle via the nozzle opening.

2. The controller according to claim 1, wherein the at least one processor is further configured to:

increase a physical pressure in the chamber of the nozzle for the dwell time in order to effect that ink is conveyed from the chamber of the nozzle, via the nozzle opening, to the nozzle plate, and remains on the nozzle plate for the dwell time; and reduce the physical pressure in the chamber of the nozzle in order to effect that the ink is conveyed back into the chamber of the nozzle via the nozzle opening.

3. The controller according to claim 1, wherein the at least one processor is further configured to:

at least partially or completely close an ink outflow of the print head while ink is being supplied to the print head via an ink inflow, in order to effect that ink is conveyed from the chamber of the nozzle, via the nozzle opening, to the nozzle plate, and remains on the nozzle plate for a dwell time; and at least partially or completely close the ink inflow while ink is being discharged from the print head via the ink outflow, in order to effect that the ink is conveyed back into the chamber of the nozzle via the nozzle opening.

4. The controller according to claim 1, wherein the at least one processor is further configured to effect, after the ink has been conveyed back into the chamber of the nozzle via the nozzle opening, that the chamber of the nozzle is flushed with ink; and/or ink is conducted through the print head via an ink inflow of the print head, through at least one ink supply channel of the print head that is connected with the chamber of the nozzle, and via an ink outflow of the print head, in order to flush the print head with ink.

5. The controller according to claim 1, wherein the at least one processor is further configured to induce an actuator of the nozzle to reduce a volume of the chamber of the nozzle for the dwell time in order to effect that ink is conveyed from the chamber of the nozzle, via the nozzle opening, to the nozzle plate, and remains on the nozzle plate for a dwell time; and to increase the volume of the chamber of the nozzle again in order to effect that the ink is conveyed back into the chamber of the nozzle via the nozzle opening.

6. The controller according to claim 1, wherein the at least one processor is further configured to:

determine, during a running printing process of the inkjet printing device in which the print head is arranged at a printing position, that the regeneration process to regenerate the print head is to be implemented;

effect, in reaction to the determination, that the printing process is interrupted and that the regeneration process is implemented, wherein the print head remains at the printing position given the implementation of the regeneration process; and following the implementation of the regeneration process, effect that the printing process is continued.

7. The controller according to claim 1, wherein the print head comprises a plurality of nozzles; and the at least one processor is configured to effect within the regeneration process to regenerate the print head, that ink is conveyed simultaneously from chambers of the plurality of nozzles, via the nozzle openings of the plurality of nozzles, to the nozzle plate, and remains on the nozzle plate for the dwell time; and that, after the dwell time has elapsed, the ink is conveyed simultaneously, via the nozzle openings of the plurality of nozzles, back into the chambers of the plurality of nozzles.

8. The controller according to claim 1, wherein the at least one processor is further configured to:

determine one or more properties of the ink with regard to a viscosity and/or an enthalpy of vaporization of the ink, and/or one or more ambient conditions with regard to a temperature and/or a humidity, in an environment of the print head; and set the dwell time depending on at least one property of the ink and/or depending on at least one ambient condition in the environment of the print head.

9. The controller according to claim 1, wherein the print head comprises a plurality of nozzles; and the at least one processor is configured to:

identify an impaired nozzle from the plurality of nozzles;

determine, based on the identified impaired nozzle, a subset of nozzles from the plurality of nozzles, for implementation of the regeneration process; and implement the regeneration process selectively for the determined subset of one or more nozzles.

10. The controller according to claim 1, wherein the print head comprises a plurality of nozzles; and the at least one processor is configured to:

identify, based on print data of a print image to be printed, a subset of one or more nozzles, from the plurality of nozzles, which are not used in a time segment for printing of the print image to be printed; and implement the regeneration process selectively for the determined subset of one or more nozzles in the time segment.

11. A method for regenerating a print head of an inkjet printing device that comprises at least one nozzle, wherein a nozzle opening of the nozzle is arranged at a nozzle plate of the print head, the method comprising, during a regeneration process to regenerate the print head, conveying ink from a chamber of the nozzle, via the nozzle opening, to the nozzle plate, and causing the ink to remain on the nozzle plate for a dwell time; and after the dwell time has elapsed, conveying the ink back into the chamber of the nozzle via the nozzle opening.

12. The method according to claim 11, further comprising:

increasing a physical pressure in the chamber of the nozzle for the dwell time in order to effect that ink is conveyed from the chamber of the nozzle, via the nozzle opening, to the nozzle plate, and remains on the nozzle plate for the dwell time; and reducing the physical pressure in the chamber of the nozzle in order to effect that the ink is conveyed back into the chamber of the nozzle via the nozzle opening.

13. The method according to claim 11, further comprising:

at least partially or completely closing an ink outflow of the print head while ink is being supplied to the print head via an ink inflow, in order to effect that ink is conveyed from the chamber of the nozzle, via the nozzle opening, to the nozzle plate, and remains on the nozzle plate for a dwell time; and at least partially or completely closing the ink inflow while ink is being discharged from the print head via the ink outflow, in order to effect that the ink is conveyed back into the chamber of the nozzle via the nozzle opening.

14. The method according to claim 11, further comprising, after the ink has been conveyed back into the chamber of the nozzle via the nozzle opening:

flushing the chamber of the nozzle with ink; and/or conducting ink through the print head via an ink inflow of the print head, through at least one ink supply channel of the print head that is connected with the chamber of the nozzle, and via an ink outflow of the print head, in order to flush the print head with ink.

15. The method according to claim 11, further comprising inducing an actuator of the nozzle to reduce a volume of the chamber of the nozzle for the dwell time in order to effect that ink is conveyed from the chamber of the nozzle, via the nozzle opening, to the nozzle plate, and remains on the nozzle plate for a dwell time; and to increase the volume of the chamber of the nozzle again in order to effect that the ink is conveyed back into the chamber of the nozzle via the nozzle opening.

16. The method according to claim 11, further comprising:

determining, during a running printing process of the inkjet printing device in which the print head is arranged at a printing position, that the regeneration process to regenerate the print head is to be implemented;

effecting, in reaction to the determination, that the printing process is interrupted and that the regeneration process is implemented, wherein the print head remains at the printing position given the implementation of the regeneration process; and following the implementation of the regeneration process, effecting that the printing process is continued.

17. The method according to claim 11, wherein the print head comprises a plurality of nozzles; and the method further comprises effecting, within the regeneration process to regenerate the print head, that ink is conveyed simultaneously from chambers of the plurality of nozzles, via the nozzle openings of the plurality of nozzles, to the nozzle plate, and remains on the nozzle plate for the dwell time; and that, after the dwell time has elapsed, the ink is conveyed simultaneously, via the nozzle openings of the plurality of nozzles, back into the chambers of the plurality of nozzles.

18. The method according to claim 11, further comprising:

determining one or more properties of the ink with regard to a viscosity and/or an enthalpy of vaporization of the ink, and/or one or more ambient conditions with regard to a temperature and/or a humidity, in an environment of the print head; and setting the dwell time depending on at least one property of the ink and/or depending on at least one ambient condition in the environment of the print head.

19. The method according to claim 11, wherein the print head comprises a plurality of nozzles; and the method further comprises:

identifying an impaired nozzle from the plurality of nozzles;

determining, based on the identified impaired nozzle, a subset of nozzles from the plurality of nozzles, for implementation of the regeneration process; and implementing the regeneration process selectively for the determined subset of one or more nozzles.

20. The method according to claim 11, wherein the print head comprises a plurality of nozzles; and the method further comprises:

identifying, based on print data of a print image to be printed, a subset of one or more nozzles, from the plurality of nozzles, which are not used in a time segment for printing of the print image to be printed; and implementing the regeneration process selectively for the determined subset of one or more nozzles in the time segment.

* * * * *